Aug. 26, 1958         C. A. REIMSCHISSEL ET AL         2,848,726
           TAPER THREAD CUTTING DIE HEAD WITH PIVOTED
                   LEVER MEANS TO CONTROL TAPER
Filed Dec. 31, 1954                                5 Sheets-Sheet 1

*INVENTOR*
CHARLES A. REIMSCHISSEL
DONALD E. YOUTZ

BY *Strauch, Nolan & Diggins*

ATTORNEYS

INVENTOR
CHARLES A. REIMSCHISSEL
DONALD E. YOUTZ

ATTORNEYS

INVENTOR
CHARLES A. REIMSCHISSEL
DONALD E. YOUTZ

United States Patent Office 2,848,726
Patented Aug. 26, 1958

2,848,726

TAPER THREAD CUTTING DIE HEAD WITH PIVOTED LEVER MEANS TO CONTROL TAPER

Charles A. Reimschissel and Donald E. Youtz, Waynesboro, Pa., assignors to Landis Machine Company, Waynesboro, Pa., a corporation of Pennsylvania Application December 31, 1954, Serial No. 478,966

8 Claims. (Cl. 10—120.5)

This invention relates to thread cutting mechanism and particularly to a thread cutting head adapted to cut tapered threads by causing the cutting members or chasers to recede radially during the threading operation. The chasers are also withdrawn from contact with the work upon completion of the threading operation to enable the work and the thread cutting mechanism to be separated axially in a minimum amount of time.

Two general types of such die heads exist in the prior art. In one, typified by United States Patent No. 2,054,028, the receding action or gradual withdrawal of the chasers during thread cutting to form a taper, is accomplished by a system of sliding cams. This sort of mechanism has the decided advantage of a positive receding action, that is, the taper producing mechanism is without any resilient members which would permit deviation from the proper taper angle or result in the undesirable condition on the work piece known as "chatter." However, this type of taper producing mechanism is subject to severe criticism on the ground that the necessarily large number and extensive area of the relatively sliding surfaces introduces a great amount of wear which adversely affects the accuracy of the taper after only a short period of operation.

In the second type of taper thread cutting mechanism, the chasers are caused to recede during threading by a mechanism comprising a lever having at one end a stationary fulcrum and having the other end constrained to move at a rate equal to the rate of axial feed between the die head and work piece. The chaser controlling member is connected to the lever at an appropriate intermediate point whose proportional movement will cause the chasers to generate the required taper. Such a thread cutting mechanism is shown in United States Patent No. 2,163,598. The sliding cams and their attendant disadvantages are eliminated and wear in the receding mechanism is greatly reduced. Other problems arise, however, which have not, to our knowledge, been successfully resolved by the mechanisms of the prior art.

One of these problems is that of balancing the force transmitted from the receding mechanism to the chaser controlling member. In the above-mentioned patent, the taper producing mechanism is connected to a second lever system comprising a yoke which loosely encircles the body of the head and which is connected at diametrically opposite points to the chaser controlling member. It will be noted, however, that these connecting points move in an arcuate path in the operation of the head and therefore a straight-line taper is not genereated and the chaser controlling member is caused to bind on the body of the head.

In the device of the present invention the disadvantages discussed above are eliminated by providing a taper producing mechanism comprising duplicate levers to engage and operate the chaser controlling member at diametrically opposite points, thus distributing the applied forces evenly about the circumference of the chaser controlling member. The points of connection between the taper generating lever and the chaser controlling member and between the lever and the work feeding mechanism travel in straight lines parallel to the head axis whereby an accurate taper is produced.

Another problem not solved by the prior art mechanisms of this type is that of obtaining a positive receding action similar to that of the sliding-cam type of receding mechanism. The novel latch mechanism, in combination with other novel features of the device of the present invention, effectively eliminates the undesirable effects of resilient members of the die head proper upon the receding mechanism. This important advantage insures an accurate product with a uniformly high-quality finish.

It is accordingly an object of the present invention to provide a thread cutting die head with a taper-generating mechanism of the lever type having means for positively retracting the chasers during the thread-cutting operation.

Another object is to provide a mechanism of this type having a chaser operating member upon which the forces transmitted from the taper generating mechanism are effectively balanced, while all pivot points of the lever mechanism travel in straight lines parallel to the axis of the die head.

A further object of the invention is to provide means to eliminate play due to unavoidable tolerances in the receding mechanism.

A still further object is to provide a taper-generating mechanism comprising a system of duplicate levers simultaneously actuated by a work-engaging member and simultaneously and equally adjusted for degree of taper.

It is a further object of the invention to provide a novel latch mechanism which will require less power to operate than those of the prior art, which will balance latching forces on opposite sides of the die head axis, and will effectively lock the chaser controlling member against the effect of resilient forces in either direction during the thread-cutting operation.

Another object is to provide a latch abutment of large area which inherently presents a new latching surface after a very slight diametrical adjustment, and which may be easily replaced at low cost.

A further object is the provision of a novel taper adjustment mechanism, easy of access and capable of accurate, infinite and simultaneous adjustment of two diametrically opposite taper mechanisms over a wide range of tapers.

A still further object of the invention is to provide a novel chaser carrying slide and connections thereto of great strength and rigidity.

To the above features may be added: efficient means for adjustment of thread length and diameter for various sizes of work, individual chaser adjustment, an effective supply of coolant and lubrication and maximum protection against the entry of foreign matter into the working parts of the head.

Other additional and corollary advantages will be apparent from the following description of the invention and the accompanying drawings in which.

The thread cutting mechanism employed to illustrate the invention is a die head intended to be rotated and advanced axially relative to a stationary work piece. It will be apparent to those skilled in the art that many of the features of the invention are also applicable to other thread cutting mechanisms, whether for external or internal threads and whether the work or the tool is rotated and advanced axially.

Figures 6, 19, 20:
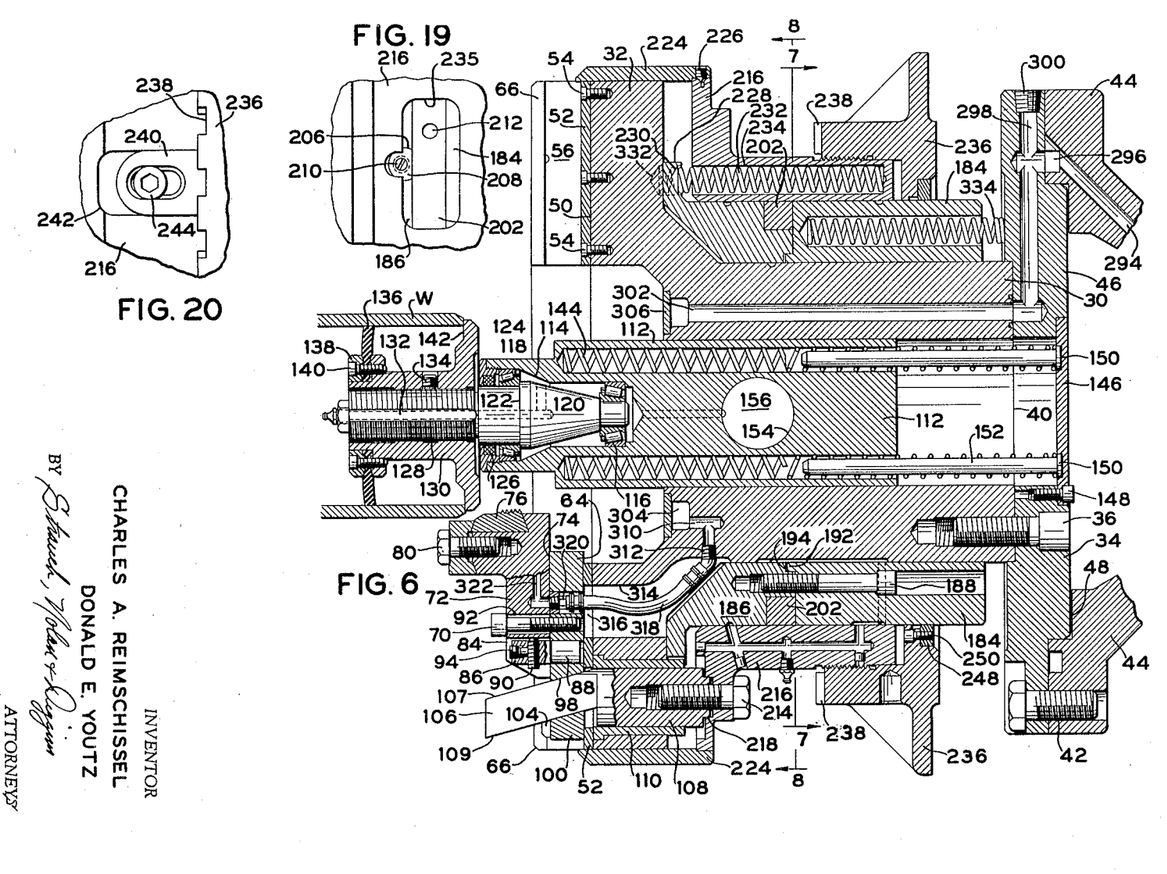
Figure 6 is a longitudinal sectional view through the die head, showing the parts in position to begin a thread cutting operation.
Figure 19 is an exterior elevation of the taper adjusting means.
Figure 20 is an exterior elevation of the means for locking the diameter adjustment.
Figures 9, 14:
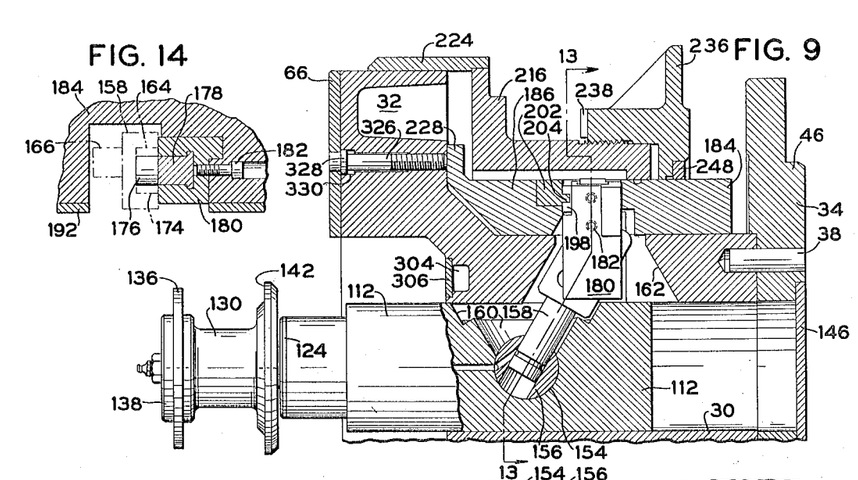
Figure 9 is a partial longitudinal section taken substantially along line 9—9 of Fig. 7.
Figure 14 is a partial sectional view taken substantially along line 14—14 of Fig. 13.

As seen in Fig. 6, the die head comprises a head body having a hollow cylindrical shank portion 30 and an integral forward flange portion 32. An attaching flange 34 is secured to the rear end of shank portion 30 by means of screws 36 and locating pin 38 (Fig. 9). A recess 40 is provided in the forward face of flange 34 to receive the rear end of shank 30 and to maintain an accurately concentric relationship between the flange 34 and the head body. The flange 34 may be secured, as by screws 42, to the forward portion 44 of a typical machine tool spindle, rotatively driven and mounted on a carriage capable of reciprocating movement in the axial direction. Concentricity between the machine tool spindle and flange 34 is insured by a centering boss 46 formed on the rear surface of the flange to engage a mating recess 48 in spindle portion 44.

Figures 1, 2, 3, 4, 5:
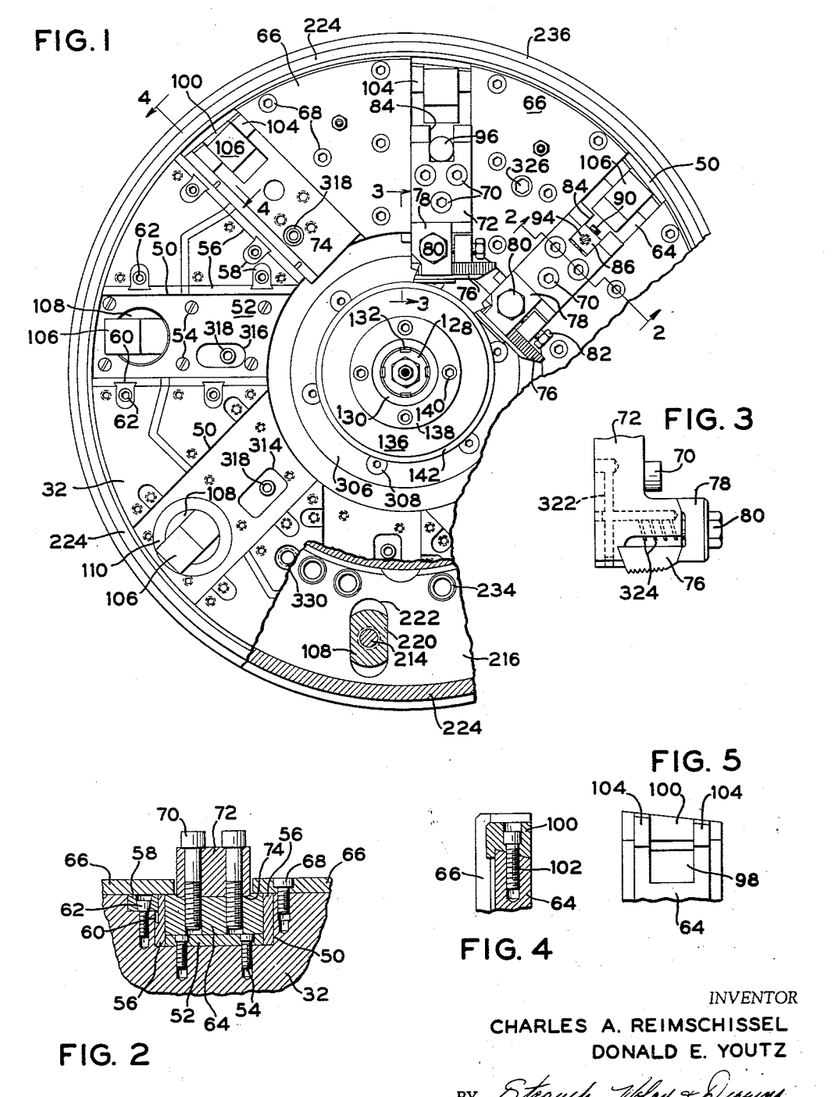
Figure 1 is a partial face view or front elevation of the die head of the invention.
Figure 2 is a sectional view taken along line 2—2 of Fig. 1.
Figure 3 is a side view of a chaser holder and chaser assembly along line 3—3 of Fig. 1.
Figure 4 is a sectional view along line 4—4 of Fig. 1.
Figure 5 is a front elevation as seen from the left side of Fig. 4.

The forward flange portion 32 of the head body is provided with a number of rectangular, radially directed slideways 50 to receive the chaser carrying devices and to support them for rectilinear movement toward and from the axis of the die head. As shown in Figs. 1 and 2, the side and bottom surfaces of each slideway 50 are protected against wear by liners in the form of flat, hardened plates. A liner 52 is secured to the bottom surface of each slideway 50 by means of screws 54. Side liners 56, 56 are held against the side surfaces of each slideway by clamps 58. Each clamp 58 is seated in a suitable recess in head body portion 32 adjacent a side of a slideway 50 and each liner 56 is provided with dovetail slots 60 to receive the mating dovetail portions of the clamps 58. The clamps 58 are secured to head body portion 32 by screws 62 having tapered heads for efficient clamping action.

A chaser slide 64 is disposed in each slideway and is retained therein by gibs 66, one each of which is secured to head body portion 32 by screws 68 between each two adjacent slideways. By overlapping a portion of the adjacent slideways, gibs 66 restrain the slides 64 against any except radial movement. Three screws 70 are employed to secure a chaser holder 72 to the forward surface of each chaser slide 64. Figure 2 shows that the forward surface of each slide 64 is provided with a longitudinal rectangular depression 74 in which the chaser holder 72 is seated, thus providing positive support for the chaser holder against rotative forces generated by the thread cutting operation.

Only two chaser holders 72 with slides 64 and one slide with the holder removed are shown in Fig. 2, the remaining holders and slides being removed for illustrative purposes. A chaser 76 is suitably supported in each chaser holder 72 and is clamped therein by a clamp 78 and a clamping screw 80. An abutting screw 82 is threaded through a portion of each chaser holder 72 to abut one end of the clamp 78 and to adjust clamp 78 and chaser 76 longitudinally as a unit to locate the cutting edge of the chaser in proper operative position. In the example shown this mechanism is similar to that shown and described in United States Reissue Patent No. 20,930 to which reference may be made for a more complete description.

Eight chaser holder and slide assemblies are employed in the die head shown. In seven of these, the chaser holder 72 is adjustable relative to the slide 64 in the radial direction for the purpose of locating each chaser 76 on precisely the same diameter and thus equalizing the cutting load among all of the chasers. The eighth assembly may be non-adjustable, the other seven being adjusted to the position of the eighth. Such adjustment is accomplished by providing a rectangular recess 84 (Figs. 2 and 6) in the radially outward end of the chaser holder 72 to receive a close-fitting rectangular block 86. Block 86 is formed as the integral extension of a pin 88 press-fitted into the chaser slide 64. An adjusting screw 90 is threaded through the block 86 to engage the bottom surface of the recess 84. It will be seen that rotation of the screw 90 will cause the chaser holder 72 to move radially relative to the slide 64. The openings 92 in chaser holder 72 for the retaining screws 70 are formed with sufficient clearance to permit the desired movement (Fig. 6). A screw 94 is also threaded into the block 86, directed perpendicularly to the axis of the screw 90, to lock the latter in adjusted position. In the non-adjustable chaser holder assembly, the block 86 is replaced by a cylindrical plug 96 (Fig. 1) against which the bottom of recess 84 abuts.

Each chaser slide 64 is also formed with a rectangular recess 98 in its radially outward end. A cap member 100 is secured to this end of the slide 64 by means of screws 102 (Fig. 4). Since the end surface of the slide and the adjacent surface of cap member 100 are inclined rearwardly, ledges 104 are provided at the sides of the cap member to overlap the top surface of slide 64 on both sides of the recess 98 to hold the cap member firmly in place. Closing the end of recess 98 in this manner forms a four-sided aperture, rectangular in cross-section and inclined outwardly and forwardly to constitute a passage for the similarly inclined cam 106. The cam 106 is formed as an integral part of a cylindrical member 108 which is journalled for movement in the axial direction in a shouldered bearing bushing 110 (Figs. 1 and 6) mounted in a suitable longitudinal bore in head body portion 32. It will be apparent that radial movement of the chaser holder and slide assembly in its slideway is effected by axial movement of the cam 106 and cylinder member 108. In this cooperative action, the inclined surfaces 107 and 109 (Fig. 6) are the operative surfaces of the cam 106. The clearance between these surfaces and the corresponding surfaces of chaser slide 64 and cap member 100, respectively, should be held to a minimum. The side surfaces of cam 106 may have a more liberal clearance relationship with the sides of the recess 98.

A pilot 112 is mounted for axial movement in the central bore of the die head. The forward end of pilot 112 is recessed at 114 to receive anti-friction bearings 116 and 118. A spindle 120 is journalled in bearings 116 and 118 and bearing 116 is retained in position axially between the bottom of recess 114 and a shoulder on spindle 120. The bearing 118 is retained in axial position between shoulder 122 on spindle 120 and the rear end of a cap member 124 threaded into the forward end of pilot 112. A seal 126 is provided in cap member 124 to retain lubricant in the recess 114. The forwardly projecting portion 128 of spindle 120 is externally threaded to engage the threaded bore of a work-abutting member 130. As shown in Figs. 1 and 6, portion 128 is provided with shallow longitudinal grooves 132 at 90° intervals. A radially directed screw 134 is threaded through the wall of member 130 to engage one of the grooves 132 to prevent relative rotation between member 130 and portion 128. A disc 136 made of leather, oil resistant synthetic rubber or other flexible material is clamped to the forward end of member 130 by means of a clamping ring 138 and screws 140. It will be evident from Fig. 6 that, during operation, a work-abutting surface 142 on a flange portion of member 130, engages the end of the pipe W to be threaded while the flexible disc 136 projects into the pipe, closely engaging the internal wall thereof to prevent coolant from flowing through the pipe away from the die head. It will also be apparent that the axial position of the member 130 and therefore of surface 142 is adjustable on the spindle 120 merely by rotating the member 130 and locking it in adjusted position by causing the screw 134 to engage one of the slots 132.

The pilot 112 is urged forwardly by springs 144 disposed in longitudinal bores in the plunger and held in compression between the bottoms of said bores and a circular plate 146 which is secured in a counterbore in the rear surface of attaching flange 46 by means of screws 148. Shallow circular depressions 150 are formed in the forward surface of plate 146 to support the headed ends of guide rods 152 which extend forwardly within springs 144 to keep them aligned and prevent buckling.

Figures 7, 12:
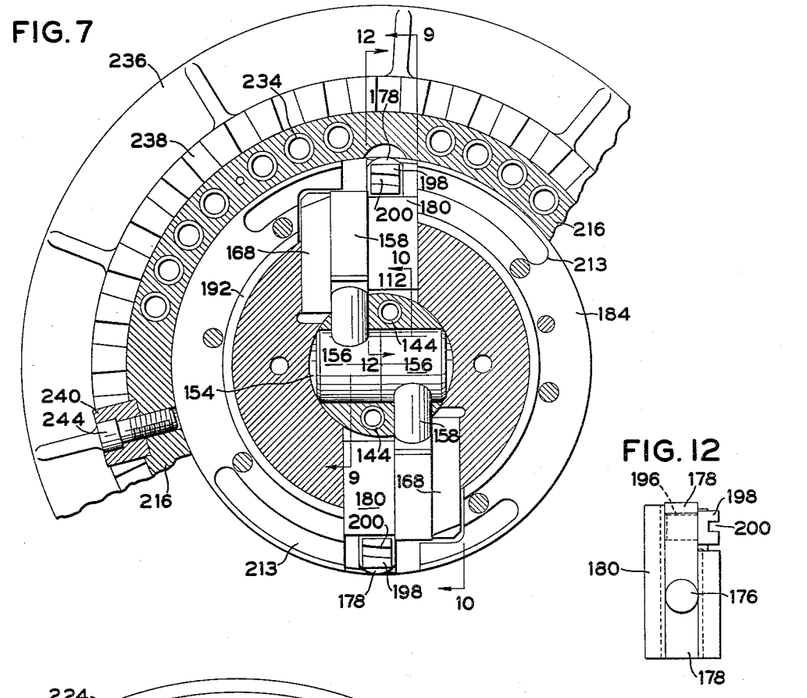
Figure 7 is a partial transverse section taken substantially along line 7—7 of Fig. 6.
Figure 12 is a partial sectional view taken along line 12—12 of Fig. 7.
Figure 10:
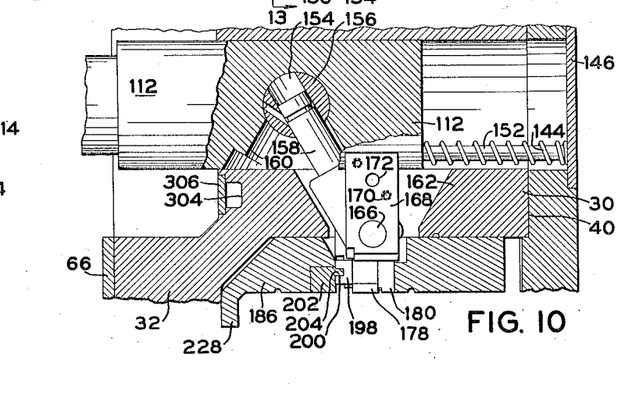
Figure 10 is a partial longitudinal section taken substantially along line 10—10 of Fig. 7.

A transverse bore 154 is formed in pilot 112 as a bearing for a pair of cylindrical pivots 156 (Fig. 7). A taper-generating lever 158 is journalled transversely through each of the pivot members 156 and the two levers 158 extend outwardly in opposite directions from their respective pivots. The pilot 112 is voided as at 160 to permit each of the levers to rotate through a wide arc (Figs. 9 and 10). The shank portion 30 of the head body is also cut away at 162 to accommodate the swinging movement of the levers 158 which extend therethrough.

Figure 11:
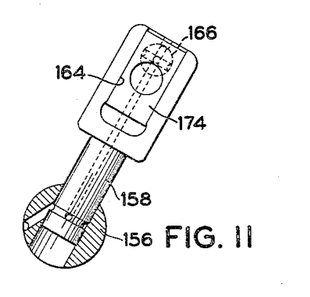
Fig. 11 is a detail view showing certain of the parts of Figs. 9 and 10.
Figure 13:
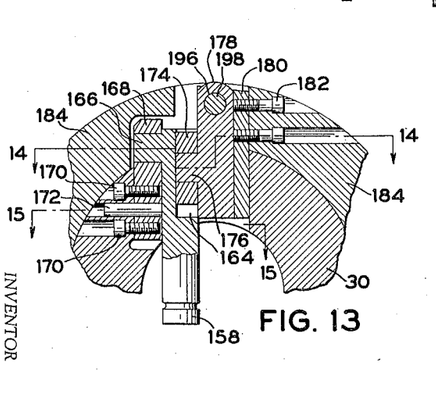
Figure 13 is a partial sectional view taken along line 13—13 of Fig. 9.
Figure 15:
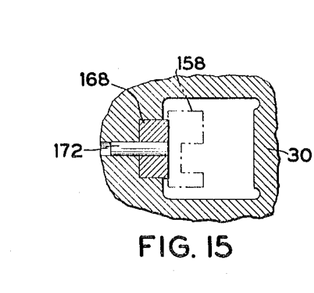
Figure 15 is a partial sectional view taken substantially along line 15—15 of Fig. 13.

The taper lever 158 is formed with a rectangular portion having on one side a rectangular groove or slideway 164 (Fig. 11) and on the opposite side an integral, projecting, cylindrical pin 166. Pin 166 is journalled for rotation in a block 168 which is secured to head body shank portion 30 adjacent opening 162 by means of screws 170 and pin 172 (Fig. 13). A block 174 is mounted for sliding movement in the slideway 164 and is provided with a cylindrical opening to receive a pivot pin 176. Pin 176 is formed integrally with a slide member 178, T-shaped in transverse section (Fig. 14) and mounted for vertical sliding movement in a closely fitting slideway in a bracket 180. Screws 182 unite the bracket 180 to the rear portion 184 of a latch ring which is slidably mounted on shank portion 30 of the head body.

Figure 16:
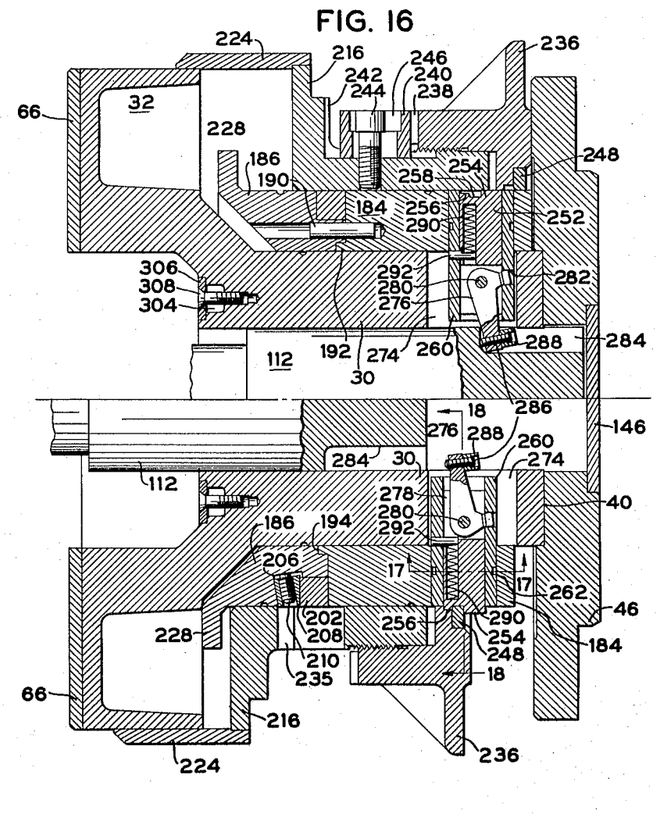
Figure 16 is a longitudinal sectional view through the die head, showing the latch mechanism and other parts in open and closed position.

A forward portion 186 of the latch ring (Fig. 6) is also mounted for sliding movement on shank portion 30 and moves as a unit with the rear portion 184, being connected thereto by means of screws 188 and pins 190 (Fig. 16). The two halves 184 and 186 of the latch ring are maintained in concentric relation independently of the head body by means of an annular centering boss 192 on the forward surface of portion 184 which mates with an annular counterbore 194 in forward portion 186.

Figure 8:
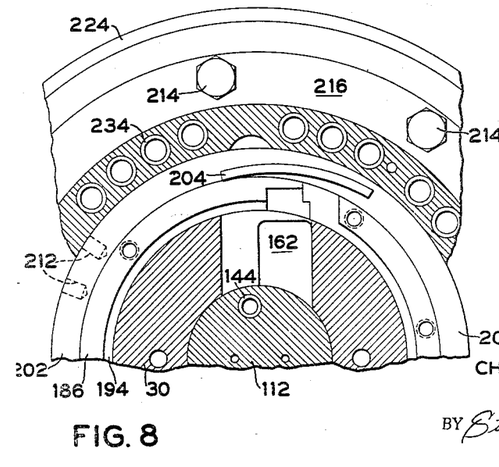
Figure 8 is also a partial transverse section along line 7—7 of Fig. 6, but looking in the opposite direction.

Referring now to Figs. 9, 10, 12 and 13, the slide 178 is provided with a bore 196 whose axis is parallel to the die head axis when the slide 178 is assembled. A square-headed plug 198 is mounted in bore 196 to project forwardly therefrom. A rectangular cam groove 200 is formed in the forward surface of plug 198. The forward portion 186 of the latch ring is reduced in diameter adjacent to its rearward edge and in the recess so formed is disposed a ring 202. This ring 202 has formed on its rearward surface two diametrically opposite spiral cam portions 204 (Figs. 8, 9, 10) which project rearwardly to engage the cam grooves 200 in slides 178.

A cylindrical recess 206 (Figs. 16 and 19) is formed in latch ring portion 186 adjacent the taper adjusting ring 202 and with its axis inclined with respect to the die head axis. A plug 208 with one side beveled off is disposed in recess 206 and has a set screw 210 threaded therethrough to engage the bottom of the recess. It will be seen that rotation of the screw 210 in one direction will cause the flat side of plug 208 to press against the side of ring 202 and thus clamp the ring against rotation. When screw 210 is turned in the other direction, the ring 202 is released and may be rotated manually using one of the recesses 212 (Fig. 8) in the circumference of the ring. Such rotation will cause the cams 204, by virtue of their engagement with the plugs 198, to adjust the radial position of the slides 178. It should be understood that when the ring 202 is locked in adjusted position by the plug 208 the position of the slides 178 is stationary with respect to the latch ring 184, 186. Arcuate slots 213 are formed in the forward surface of latch ring portion 184 to permit rotation of the cam ring 202 by providing a space for the cams 204.

As shown in Fig. 6, all of the chaser-operating cam cylinders 108 are connected, by means of screws 214, to a common closing ring 216 which is mounted for longitudinal sliding movement on the latch ring 184, 186. A centering boss 218 is formed on the rear end of each cam cylinder 108 to engage a mating recess in the forward face of the flanged closing ring 216. Opposed flat surfaces 220 are also formed on cylinder 218 to engage the sides of an elongated counterbore 222 in the forward surface of closing ring 216 (Fig. 1). This prevents any tendency of the cam cylinder to rotate relative to the closing ring or head body. A cover sleeve 224, overlapping the head body flange portion 32 is attached to closing ring 216 by means of screws 226 whose conical points engage suitable recesses in the edge of the flange of closing ring 216. The forward portion 186 of the latch ring is also flanged at its forward end as at 228 to provide a forward surface to abut against the rear of head body flange 32 and a rearward surface to contain a plurality of circular recesses 230. Compression springs 232 have one end seated in recesses 230 and the other end seated in axial bores 234 in the closing ring 216. An opening 235 (Fig. 19) is formed in closing ring 216 to provide easy access to the taper adjusting mechanism described above.

A diameter adjusting ring 236 is mounted on the rear latch ring portion 184 rearwardly of the closing ring 216. The ring 236 extends forwardly exteriorly of a portion of the closing ring 216 and is threadedly connected thereto. Thus rotation of ring 236 relative to closing ring 216 will alter the axial position of these two rings relative to each other. Undesired relative rotation is prevented by a series of radial notches 238 (Fig. 20) formed in the forward edge of adjusting ring 236 and adapted to be engaged by a key 240 secured in a recess 242 on the circumference of closing ring 216 by means of a screw 244. It will be evident that the elongated slot 246 formed in the key 240 for screw 244 permits the key to be moved axially of the die head. The recess 242 is also elongated for this purpose.

Figure 21:
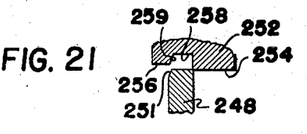
Figure 21 is an enlarged fragmentary view of the latch mechanism.

A counterbore is provided in the rear surface of adjusting ring 236 to receive a latch abutment ring 248 which is secured to the adjusting ring by screws 250 (Fig. 6). The ring 248 is adapted to be engaged and held in operating position by latch members 252 carried by the latch ring 184. The abutment ring is provided in the areas contacted by the latch members 252 with a beveled surface 251 for a purpose to appear. This is best shown in Figs. 16, 17, 18 and 21. The lower half of Figure 16 illustrates the head parts when the abutment ring 248 is engaged by the latch and the adjusting ring 236 and closing ring 216 are held against the force of the head opening springs 232 disposing the chasers 76 in thread cutting position. The upper half of Figure 16 shows the head parts at the end of the threading operation with the latch released and rings 216 and 236 moved rearwardly by the springs 232 and the chasers withdrawn from the work. Figure 21 illustrates the parts just prior to latching.

The latching mechanism comprises the two latches 252 on diametrically opposite sides of the head and each formed as a cylinder having on its outer end a rear projection 254, a forward projection 256 and a groove 258 therebetween. As shown the projections 254 and 256 which engage opposite sides of the abutment ring 248 are of different height, the outer surface of projection 254 being radially offset outwardly with respect to the outer surface of projection 256 to facilitate proper latching as will appear. The forward wall 259 of groove or recess 258 is forwardly inclined for a similar purpose. The inclination of the wall 259 and the bevel 251 are the same, preferably about 3°. The parts are so dimensional that ring 248 cannot bottom in recess 258. Accordingly the parts are held in wedging engagement to insure accuracy of position.

Figure 17:
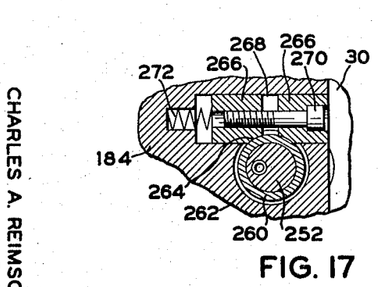
Figure 17 is a partial sectional view taken along line 17—17 of Fig. 16.
Figure 18:
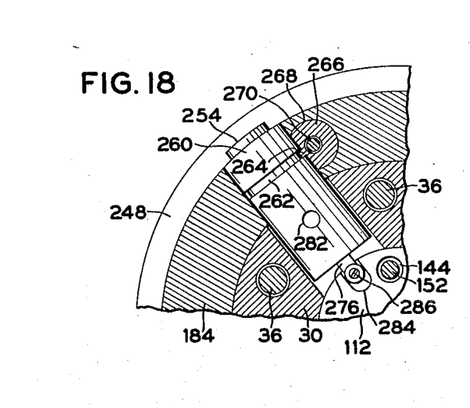
Figure 18 is a partial sectional view taken substantially along line 18—18 of Fig. 16.

The latch 252 is journalled for axial movement in a bushing 260 directed radially of the die head and secured in the latch ring 184 by a mechanism best seen in Fig. 17. An annular groove 262 is formed in the outer circumference of bushing 260 and is engaged by keying projections 264 formed on a pair of cylindrical members 266 which are disposed in a suitable recess 268, the axis of recess 268 and of the cylindrical members 266 being parallel to the head axis and perpendicular to the axis of the bushing 260. Since the keys 264 of members 266 engage the bushing 260 from opposite sides and since they are connected by a cap screw 270, the bushing 260 is restrained against rotative as well as axial movement when the screw 270 is tightened. A spring 272 is disposed in the bottom of the recess 268 to facilitate assembly of the mechanism.

The bushing 260 extends inwardly into an elongated opening 274 in the shank portion 30 of the head body. A bell crank lever 276 for tripping the latch is pivotally mounted in a transverse slot 278 in the inner end of latch 252. A pin 280, embedded in the latch 252 and passing through the slot 278, serves as a fulcrum for the bell crank lever 276. The end of one arm of lever 276 is a stationary pivot by virtue of its engagement in an opening 282 in one wall of bushing 260. The other arm of lever 276 extends into the central bore of the die head and thus into the path of movement of the pilot 112. A slot 284 is formed in the rear end of pilot 112, aligned with the protruding lever 276. An adjusting screw 286 is threaded through the end of lever 276 and is retained in adjusted position by a lock nut 288. The latch 252 is urged radially outward by a spring 290 which is held in compression in a bore in latch 252 by means of a pin 292 pressed into one wall of bushing 260.

The die head comprises means for delivering coolant to discharge points adjacent the cutting edge of each chaser 76. The coolant is brought to the head through an opening 294 (Fig. 6) in the machine spindle 44. An annular channel 296 is formed in the forward surface of spindle 44 to connect with a plurality of radial bores 298 in the attaching flange 46. Plugs 300 are provided to close the outer ends of bores 298 which lead to a like number of axially directed bores 302 in the shank portion of the head body. At the forward end of the head body the bores 302 terminate in an annular channel 304 closed by a plate 306 which is secured in place by screws 308 (Fig. 16). Other openings 310 connect the channel 304 to fittings 312, one of which is located in an opening 314 through head body flange portion 32 directly behind each slideway 50. An opening 316 is provided in the bottom slideway liner 52 and is aligned with the opening 314 to provide a passage for a flexible tube 318 which joins the fitting 312 to a fitting 320. The fitting 320 is mounted in an opening through the chaser slide 64 and permits coolant to flow from channel 304 into a passage 322 in chaser holder 72 whence it is discharged adjacent the cutting edge of chaser 76 through openings 324 (Fig. 3).

In operation the die head is rotated and advanced positively and accurately axially toward the stationary work piece W by a suitable lead screw or cam in accordance with conventional practice. The resilient coolant seal 136 is inserted into the pipe which immediately thereafter engages the surface 142 of the abutting member 130. The member 130 and its spindle 128 are then held against rotation by the frictional contact of the work piece, the rotation of the die head relative to the spindle 128 being rendered virtually frictionless by the bearings 116 and 118. As the die head advances and as threads are being cut on the work piece by chasers 76, the pilot 112 is held axially stationary. At the start of this relative axial movement between the pilot and the remainder of the die head, the taper generating mechanism is in the position shown in Figs. 9 and 10 and the head is latched in closed or thread cutting position as shown in the lower half of Fig. 16.

Since the pivots 166 are mounted with their axes stationary with respect to the head body (Fig. 13) they undergo the same forward movement. That is, the pivots 156 are held axially stationary while the pivots 166 move forward at the rate at which the thread is being cut. Thus the levers 158 swing forward about the pivots 156 as fulcrums, sliding in the openings in pivots 156 since the pivots 166 move forward in lines parallel to the die head axis rather than in arcs. In this movement of levers 158, the pivots 176 are also carried forward but at a somewhat lesser rate than that of pivots 166, due to their shorter distance from the fulcrums 166. Each pivot 176 is stationary relative to the latch ring 184, 186 during operation but, since the pivots 176 are connected to levers 158 by the sliding blocks 174, they also move forwardly in lines parallel to the head axis. Therefore the ratio between the distance moved by the pivots 166 during the thread cutting operation to that moved by the pivots 176 is directly proportional to the distances of their respective centers from the center of the pivots 156.

Now, since pivot 176 moves forward at a slower rate than pivot 166 and since pivot 176 is stationary relative to the latch ring 184, 186 the latch ring will be somewhat retarded relative to the head body. The latch ring 184 is united with the adjusting ring 236 by the latch mechanism and the adjusting ring is positively connected to the closing ring 216. Therefore the closing ring also will advance at a slower rate than the head body and the chasers will gradually recede outwardly to form a tapered thread.

The degree of taper produced is dependent upon the difference in length of travel between the head body and the closing ring 216, which, as explained above, is dependent upon the distance of the axes of pivots 176 from the axis of the fulcrums 156. This distance may be altered to adjust the degree of taper by adjusting the slides 178 radially. The mechanism for effecting the radial adjustment of slides 178 has also been explained above. It will be apparent that this adjustment for taper is infinitely variable over the range permitted by the dimensions of the parts. It will be noted that, as the axes of pivots 176 are moved radially outward from the position shown in Figure 13, the levers 158 will be inclined further forwardly (Figs. 9 and 10). To maintain the original inclination of levers 158 and thus also the position of the work-abutting member 130 shown in Figures 9 and 10, which illustrate the taper mechanism set for the maximum taper which it is capable of producing and to prevent the levers 158 from striking the sides of the openings 160 and 162, a further adjustment is made in the axial position of the latch ring 184, 186.

At the start of an operation as shown in Figs. 9 and 10, the flange 228 of latch ring portion 186 abuts against the rear surface of head body flange 32. Now when the slides 178 are moved radially outward to adjust the mechanism to a smaller taper the latch ring 184, 186 must be moved rearwardly to maintain the inclination of levers 158. This setting is accomplished by the screws 326 which are threaded through the head body flange 32. In the position shown, the screws 326 are withdrawn until the shoulders 328 engage the bottom surface of gibs 66 through which the heads of the screws project. At this point the ends of the screws 328 are flush with or slightly forward of the rear surface of head body flange 32. When the initial position of latch ring 184, 186 is to be adjusted to the rear, the screws 328 are screwed in to project from the rear surface of flange 32 and thus provide an abutment in lieu of that surface for the latch ring flange 228 to seat against at the start of a thread cutting operation. The counterbore 330 is provided to permit this movement of the screw 326. If, as is customary in practice, the die head is intended to operate principally on two different tapers only, it is advantageous to have the bottom of the counterbore establish the setting for the smaller of the two.

A large adjustment for work diameter is made by replacing the chaser holders 72, the same slides being used and in substantially the same position, for all diameters. Fine adjustment of all of the chasers as a unit is made by moving the adjusting ring 236 forward or back relative to the closing ring 216 as described above. This alters the position of the cams 106 without changing the locked position of the latch abutting ring 248 and hence changes the diameter on which the chasers are set.

Because the outside diameter of a pipe and hence the thread diameter at the end of the threading operation is always constant regardless of the length of the thread, it is desirable to have the threading operation terminate after a fixed axial travel of the die head which will be the same for all thread lengths. The setting shown in Figs. 6 and 9 will accommodate the maximum thread length. If a shorter thread length is desired, the set screw 134 is withdrawn and the abutting member 130 is rotated on its threaded spindle 128 to move the surface 142 forward a distance equal to the difference between the maximum thread length and the thread length desired, thereafter retightening the screw 134. It will be evident, therefore that threading will actually begin after the receding action has been in operation for various times when threading various thread lengths. The threading operation will always end, however, with the receding mechanism in the same position and therefore when the same diameter has been reached in the receding movement. For threading different diameters of pipe, the abutting member 130 is replaced by one having the correct diameter and on these substitute abutting members, the surface 142 is always located to accommodate the maximum length of thread corresponding to the respective diameter.

When the taper mechanism has caused the chasers to recede far enough to reach the diameter required at the large end of the tapered thread and when the required length of thread has been threaded, which two events should occur simultaneously, the die head will have moved far enough forward relative to pilot 112 to bring the screws 286 into contact with the ends of slots 284 in the plunger. Thus the bell crank levers 276 are rocked about the stationary pivots in openings 282 and the pins 280 will pull the latches 252 radially inward, releasing the positive latch between latching ring 184, 186 and the adjusting-closing ring assembly 216, 236. Consequently, the adjusting ring 236 and the closing ring 216 move rearward under the impetus of head opening springs 232 until the adjusting ring comes to rest against the forward surface of the attaching flange 34 as shown in the top half of Fig. 16. This movement of the closing ring 216 abruptly withdraws the chasers 76 radially out of contact with the work and the head may be retracted axially to its original position.

When the head is thus withdrawn axially, the flange of adjusting ring 236 encounters positive stops (not shown) on the machine frame and is moved forward relative to the head body, carrying with it the closing ring 216 and forcing the chaser holders radially inward. In such resetting mechanisms it is usual to provide for a certain amount of overtravel, that is, due to the difficulty of establishing a withdrawal movement for the head which would be precisely correct to register the latching components, the adjusting ring is pushed forward a short distance beyond latching position and permitted to fall back after the pressure of the stops is removed. As the adjusting ring moves forward the latches are urged outwardly by springs 290 to engage the abutment ring 248 in the groove 258. The forward latch projection 256 is made shorter than the rear projection 254 to give the abutment ring 248 a short time to pass the groove 258 without latching on the forward travel of the adjusting ring 236. The closing force applied to the adjusting ring is then released and latching does occur as the adjusting ring moves a short distance rearwardly and the latches are forced outwardly to engage both sides of the ring 248. Positive latching is facilitated by the mating beveled surface 251 and 259 on the latch 252 and the ring 248, respectively. The surfaces produce a wedging action which maintains the rear surface of the ring in tight engagement with the adjacent surface of the groove and thus prevents lost motion while permitting free latching and unlatching.

Since both the abutment ring and the latch members may be removed from the head the latching surfaces can be renewed economically by replacement of the latching components rather than the expensive major components.

As the head is withdrawn axially from the work, the head opening springs 232, pressing forwardly against the latch ring 186 tend to force the pivots 176 forward. This force is transmitted in reduced magnitude through the levers 158 to the pilot 112 and tends to maintain it in contact with the finished pipe. Thus the receding mechanism is reset to its starting position and the latch-tripping grooves 284 are also removed from proximity to the levers 276. The springs 144 are provided to assist in this resetting movement but may be dispensed with if they are found to be unnecessary.

It will be noted that, during the receding movement, the latch ring 184, 186, the closing ring 216 and the adjusting ring 236 move as a unit, being connected by the positive latches against relative motion in either direction. It is found in practice, however, that due to unavoidable tolerances and other minor sources of lost motion or backlash in the receding mechanism, the quality of the product can be improved under certain conditions by biasing the entire assembly of latch ring, closing ring and adjusting ring forwardly or rearwardly relative to the head body. The direction of bias as well as its necessity is subject to varying conditions of manufacture and use. If a rearward bias is required, two of the depressions 230 (Fig. 6) may be extended through the flange 228 of the latch ring permitting one pair of the springs to seat in depressions 332 in the rear surface of the head body flange 32 as shown in dotted lines. If a forward bias is required, compression springs 334 may be inserted in axial bores in the rear portion 184 of the latch ring to press against the forward surface of the attaching flange.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a die head having a plurality of chaser holders mounted for radial movement in a body and control assembly mounted for axial movement on said body, operatively connected to said chaser holders and adapted upon axial movement with respect to said body to move said chaser holders radially: means to relatively axially move said control assembly with respect to said body during threading to produce a tapered thread comprising; a pilot mounted for axial movement within said body substantially centrally thereof and adapted to be moved axially by a workpiece during relative feeding movement of said head and said workpiece; a pair of levers pivotally associated with said pilot at points laterally offset from the axis of said pilot and extending radially outward therefrom; means pivotally mounting said levers adjacent their respective outer ends in said body; pivot means radially inward of said last-mentioned means pivotally connecting each of said levers to said control assembly; the pivotal connections between said levers and said control assembly and between said levers and said pilot being constructed and arranged to permit relative radial sliding movement of said levers with respect to said pilot and said control assembly whereby said control assembly is moved by forces acting parallel to the axis of said head; means mounting said pivot means for radial movement to adjust the amount of taper; and means for simultaneously and equally adjusting the radial position of said pivot means.

2. In a die head having a plurality of chaser holders mounted for radial movement in said body and a control assembly mounted for relative axial movement on said body, operatively connected to said chaser holders and adapted, upon axial movement with respect to said body to move said chaser holders radially: means to relatively axially move said control assembly with respect to said body during threading to produce a tapered thread comprising; a pilot mounted for axial movement within said body substantially centrally thereof and adapted to be moved axially by a workpiece during relative feeding movement of said head and said workpiece; a pair of levers mounted for pivotal and radial sliding movement with respect to said pilot at points laterally offset from the axis of said pilot and extending radially outward therefrom; means pivotally mounting said levers adjacent their outer ends in said body; a pair of pivot members each containing a pivot for said levers positioned radially inward from the pivotal connection of the levers to the body; means connecting said pivots to said levers, said means being effective to permit relative sliding movement of said levers with respect to said control assembly radially of said head; means mounting said pivot members for radial movement in said control assembly; an annular taper adjusting member mounted for rotating movement with respect to the axis of said body; and means forming cooperating cam surfaces on said taper adjusting member and said pivot members effective to convert rotary movement of said taper adjusting member to simultaneous equal radial movements of said pivot members to thereby adjust the amount of taper.

3. The die head according to claim 2 together with means for adjusting the axial position of said pivot members to thereby maintain the taper levers in their original angular positions with respect to the axis of said head.

4. In a die head having a plurality of chaser slide assemblies mounted for radial movement in a body and a closing ring mountd for axial movement on said body: a plurality of cams of substantially rectangular section secured to said closing ring with their axes disposed at an angle with respect to the axis of said head, said cams having inner and outer operating surfaces; means forming open grooves in each of said chaser slide assemblies; said grooves having one surface in close clearance relation with one of said operating surface of said cams; cover means; and means detachably securing said cover means to said chaser slide assemblies to close said open groove, said cover means having a surface in close clearance relation with the other operating surface of said cams.

5. In a die head having a body, a chaser control assembly and a central pilot adapted to be contacted by a workpiece and to be moved thereby during relative feeding movement of said workpiece and said head, a taper producing lever pivotally and slidably connected to said pilot and pivotally connected to said body, a member mounted for radial movement in said head pivotally and slidably connecting said lever to said chaser control assembly, an annular taper adjusting member mounted for rotating movement with respect to the axis of said head, means forming cooperating cam surfaces on said taper adjusting member and said pivot member effective to convert rotary movement of said taper adjusting member to radial movement of said pivot member to thereby adjust the amount of taper produced by movement of said taper lever.

6. In a die head having a plurality of chaser holders mounted for radial movement in a body; a control assembly mounted for relative axial movement on said body between a pair of spaced radially extending body flanges, said control assembly being operatively connected to said chaser holders and adapted upon axial movement to move said chaser holders radially; means to relatively axially move said control assembly with respect to said body during threading to produce a tapered thread; means forming axially extending recesses in said control assembly, certain of said recesses opening toward one of said body flanges and others of said recesses opening toward the other of said body flanges, said recesses being adapted to position springs compressed between the bottom of said recess and the respective body flange whereby said springs when positioned in said ceretain of said recesses bias said control assembly in one direction and said springs when positioned in said other of said recesses bias said control assembly in the opposite direction to eliminate lost motion and backlash.

7. In a die head having a plurality of chaser holders mounted for radial movement in a body; a control assembly mounted for relative axial movement on said body toward and away from a radially extending body flange; means operatively connecting said chaser holders and said control assembly whereby axial movement of said control assembly controls the radial position of said holders; means to relatively axially move said control assembly toward said body flange during threading to move said chaser holders in opening direction; and a plurality of springs compressed between said control assembly and said body flange to oppose said axial movement of said control assembly during threading and thereby eliminate backlash and lost motion.

8. In a die head having a plurality of chaser holders mounted for radial movement in a body: a latch ring assembly mounted for sliding axial movement on said body; a closing ring assembly mounted for axial sliding movement on said latch ring assembly, operatively connected to said chaser holders and adapted, upon axial movement, to move said chaser holders radially between open and closed positions; a pilot mounted for axial movement within said body substantially centrally thereof and adapted to be moved axially of said head by a workpiece during relative feeding movement of said head and said workpiece; a pair of laterally offset levers mounted for pivotal and radial sliding movement on said pilot and extending outwardly therefrom toward opposite sides of said body; means pivotally connecting said levers adjacent their outer ends to said body; means pivotally and slidably connecting said levers to said latch ring assembly inwardly of their pivotal connection to said body; and means for selectively latching said closing ring assembly to said latch ring assembly whereby said closing ring assembly will move with said latch ring assembly under the influence of said lever when said latch ring assembly and said closing ring assembly are latched together and said closing ring assembly will move independently of said latch ring assembly and said levers when unlatched from said latch ring assembly to move said chaser holders to open and closed positions independently of said levers.

References Cited in the file of this patent

UNITED STATES PATENTS

| | | |
|---|---|---|
| 1,643,832 | Breitenstein | Sept. 27, 1927 |
| 1,683,126 | Breitenstein | Sept. 4, 1928 |
| 2,024,278 | Drissner et al. | Dec. 17, 1935 |
| 2,130,181 | Hogg | Sept. 13, 1938 |
| 2,219,316 | Hogg | Oct. 29, 1940 |
| 2,291,744 | Nell | Aug. 4, 1942 |
| 2,403,015 | Nell | July 2, 1946 |
| 2,501,601 | Finn | Mar. 21, 1950 |
| 2,534,878 | Packer | Dec. 19, 1950 |
| 2,557,069 | Berkey | June 19, 1951 |
| 2,574,260 | Griffith | Nov. 6, 1951 |
| 2,746,066 | Finn | May 22, 1956 |